Figure 1:
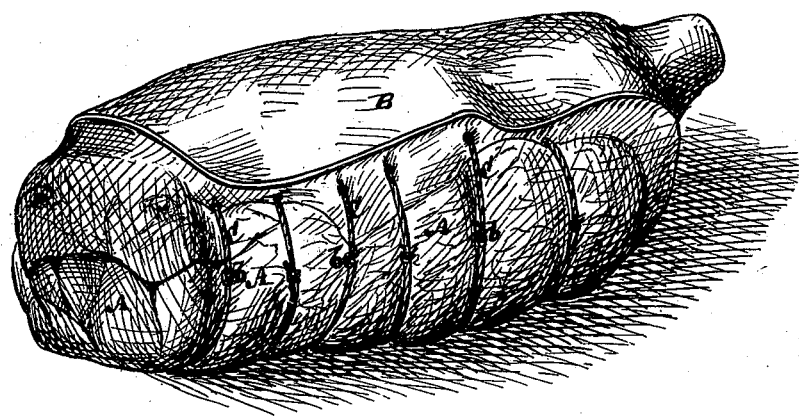

A. WARNER.
Preparation of Boned Hams.

No. 209,948. Patented Nov. 12, 1878.

Witnesses
John Becker
Fred. Haynes

Inventor
Alexander Warner
by his Attorneys
Brown & Brown

UNITED STATES PATENT OFFICE.

ALEXANDER WARNER, OF NEW YORK, N. Y.

IMPROVEMENT IN PREPARATION OF BONED HAMS.

Specification forming part of Letters Patent No. 209,948, dated November 12, 1878; application filed October 15, 1878.

*To all whom it may concern:*

Be it known that I, ALEXANDER WARNER, of the city, county, and State of New York, have invented a new and useful Improvement in the Preparation of Boned Hams, of which the following is a description, reference being had to the accompanying drawing, forming part of this specification.

Heretofore it has been customary, in order to secure the meat of a ham after its bone has been removed, to pass a series of cords or binders around the outside of the skin or rind of the ham, and to fasten the ends of said cords, binders, or ties together, or else to secure the meat by a single cord passed around the outside of the ham and its skin or rind in several places or various directions, and fastened by knotting or tying said cord at different points throughout its length. After a boned ham thus prepared has been boiled and the skin or rind removed, the securing cord, ties, or binders must either be removed with the skin or rind, or, if left on the ham, they become very much loosened by the stripping of the rind from the meat, and hence said securing means serve but very imperfectly to sustain the cut parts which they are intended to hold together, and the ham is liable to become irregularly separated and broken when carved or sliced.

By the term "boned ham" is meant a ham from which the whole or such portion of the bone has been removed as to require ties to hold the meat together.

My invention obviates the defect above recited; and has for its object the production, as a new article of merchandise, of a boned ham having its portions which have been cut for removal of the bone secured by one or more ties or binders, which shall not only serve to hold the ham together when the rind is on it, but shall also serve to perfectly secure the cut portions of the meat after the rind has been removed; and by the means described of tying a boneless ham I am enabled to remove the rind after the ham has been boiled without removing or disturbing the ties, and after the rind has been removed it is not necessary that the ties be exposed at such parts, inasmuch as the ties can be passed through the meat beneath the rind, and thus when the latter is removed after boiling the ties will still remain concealed at such portions of the ham. To this end I tie up the boned ham by passing the cords or binders, preferably two or more separate ones, around the ham under the skin or rind instead of over it, and then fastening the ends of said binders together. This disposition of the cords or binders may be effected by means of a curved or suitably-shaped needle, having the securing cord or binder attached to it, and passing said needle with its attached cord or binder through the meat and under the skin or rind of the ham. Five or six, or a greater or less number, of such separate cords or binders may be used, if desired, or a continuous cord, passing spirally around the ham, under the skin or rind, and through the meat next to the rind, may be employed; but a series of separate cords or binders are preferred.

Figure 2:
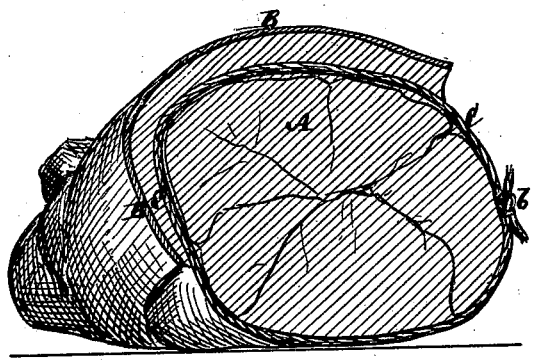

Figure 1 of the accompanying drawing represents a view, in perspective, of a boned ham before the skin or rind is removed, and showing a series of separate cords or binders as applied to said ham in accordance with my invention. Fig. 2 is a transverse section of the same.

In said drawing, A is the meat portion of the ham after so much of the bone has been removed therefrom by cutting as is desirable; B, the skin or rind of said joint; and C C, a series of separate cords or binders, of any suitable material, passed around the ham, under its skin or rind, and through the meat next to the rind, and separately fastened together at their meeting ends $b$.

When a boned ham which has been tied up in this manner has been boiled the skin or rind may be removed without disturbing the ties, cords, or binders, and the latter will hold all the cut parts of the ham closely together after the skin or rind has been removed, so that the ham may be sliced without breaking the meat; and each tie or binder, when several ties or binders are used, sustains its respective portion till reached by the knife in carving.

Cured boned shoulders may be secured in the same way.

I hereby disclaim a package for boneless hams having the skin remaining thereon, consisting of a series of transverse loops of cord passing around entirely on the outside thereof and on the outside of the rind, and united by means of a vertical loop embracing the sides of the ham, and knotted or tied to said transverse loops, the object being to enable the ham to be sliced up without severing all the cords; but such invention is open to the objections hereinbefore stated.

I claim—

The within-described mode of preparing boneless hams, the same consisting in passing the binding-ties around the ham and beneath the rind of the same, whereby when the ham is boiled the rind can be easily removed without disturbing the binding-ties, as herein shown and described.

ALEXANDER WARNER.

Witnesses:
T. J. KEANE,
HENRY T. BROWN.